(12) United States Patent
Iyer

(10) Patent No.: US 10,143,970 B2
(45) Date of Patent: Dec. 4, 2018

(54) POWER GENERATION FROM LOW-TEMPERATURE HEAT BY HYDRO-OSMOTIC PROCESSES

(71) Applicant: NRGTEK, Inc., Orange, CA (US)

(72) Inventor: Subramanian Iyer, Orange, CA (US)

(73) Assignee: NRGTEK, Inc., Orange, CA (US)

( * ) Notice: Subject to any disclaimer, the term of this patent is extended or adjusted under 35 U.S.C. 154(b) by 0 days.

(21) Appl. No.: 15/675,663

(22) Filed: Aug. 11, 2017

(65) Prior Publication Data

US 2018/0043308 A1     Feb. 15, 2018

Related U.S. Application Data

(63) Continuation-in-part of application No. 15/271,175, filed on Sep. 20, 2016, now Pat. No. 9,782,719, and
(Continued)

(51) Int. Cl.
*B01D 61/00* (2006.01)
*B01D 53/14* (2006.01)
(Continued)

(52) U.S. Cl.
CPC ....... *B01D 61/005* (2013.01); *B01D 53/1425* (2013.01); *B01D 53/1462* (2013.01);
(Continued)

(58) Field of Classification Search
None
See application file for complete search history.

(56) References Cited

U.S. PATENT DOCUMENTS

| 3,403,522 A | 10/1968 | Henry |
| 4,279,628 A | 7/1981 | Wymer et al. |

(Continued)

FOREIGN PATENT DOCUMENTS

| EP | 0571997 A1 | 12/1993 |
| EP | 2700440 A2 | 2/2014 |
| WO | 2015068160 A1 | 5/2015 |

OTHER PUBLICATIONS

PCT Form ISA237, Written Opinion, PCT/US2017/044903 (dated Oct. 18, 2017).

(Continued)

*Primary Examiner* — Daniel Berns
(74) *Attorney, Agent, or Firm* — UltimatEdge IP Law Group, P.C.; Dean G. Stathakis; Vito A. Canuso, III

(57) ABSTRACT

A system and method for generating power from waste heat, the system including (1) a forward osmosis module having an FO membrane a water inlet, a water outlet, a draw solution solute inlet and a diluted draw solution outlet; (2) a hydro-turbine using the diluted draw solution for generating power; (3) a $CO_2$ absorption reactor to permit the introduction of compressed $CO_2$ into the diluted draw solution to cause substantial separation of draw solution solute from the water, which water can be processed for subsequent recycling to the FO module, the $CO_2$ absorption reactor configured to discharge a mixture of separate draw solution solute and absorbed $CO_2$; and (4) a heat exchanger for transferring waste heat from an incoming heated fluid to the mixture of draw solution solute and $CO_2$.

3 Claims, 1 Drawing Sheet

Related U.S. Application Data a continuation-in-part of application No. 15/272,406, filed on Sep. 21, 2016, now Pat. No. 9,962,656.

(60) Provisional application No. 62/372,762, filed on Aug. 9, 2016, provisional application No. 62/417,864, filed on Nov. 4, 2016.

(51) Int. Cl.
| | |
|---|---|
| *B01D 53/22* | (2006.01) |
| *B01D 53/77* | (2006.01) |
| *B01D 53/78* | (2006.01) |
| *B01D 53/96* | (2006.01) |
| *F01K 7/22* | (2006.01) |
| *F01K 7/34* | (2006.01) |
| *F01K 25/06* | (2006.01) |

(52) U.S. Cl.
CPC ..... *B01D 53/1481* (2013.01); *B01D 53/1493* (2013.01); *F01K 7/22* (2013.01); *F01K 25/065* (2013.01); *B01D 2252/2025* (2013.01); *B01D 2252/2026* (2013.01); *B01D 2252/2041* (2013.01); *B01D 2252/502* (2013.01); *B01D 2311/2665* (2013.01)

(56) References Cited

U.S. PATENT DOCUMENTS

| | | | |
|---|---|---|---|
| 4,466,946 A | 8/1984 | Goddin, Jr. et al. | |
| 4,609,384 A | 9/1986 | Ranke et al. | |
| 5,277,884 A | 1/1994 | Shinnar et al. | |
| 6,322,612 B1 | 11/2001 | Sircar et al. | |
| 6,391,205 B1 | 5/2002 | McGinnis | |
| 6,849,184 B1 | 2/2005 | Lampi et al. | |
| 7,314,847 B1 | 1/2008 | Siriwardane | |
| 7,740,689 B2 | 6/2010 | Fradette et al. | |
| 7,757,490 B2 | 7/2010 | Kenessey | |
| 7,955,506 B2 | 6/2011 | Bryan et al. | |
| 8,021,549 B2 | 9/2011 | Kirts | |
| 8,021,553 B2 | 9/2011 | Iyer | |
| 8,083,942 B2 | 12/2011 | Cath et al. | |
| 8,133,307 B2 | 3/2012 | Suzuki | |
| 8,252,091 B2 | 8/2012 | Anand et al. | |
| 8,398,757 B2 | 3/2013 | Iijima et al. | |
| 8,551,221 B2 | 10/2013 | Wolfe | |
| 8,647,421 B2 | 2/2014 | Yonekawa | |
| 8,702,846 B2 | 4/2014 | Menzel | |
| 8,959,915 B2 | 2/2015 | Bruckner et al. | |
| 9,216,917 B2 | 12/2015 | Carmignani et al. | |
| 9,219,404 B2 | 12/2015 | Takahashi et al. | |
| 9,376,938 B2 | 6/2016 | Takahashi et al. | |
| 9,677,414 B2 | 6/2017 | Takahashi et al. | |
| 2009/0130411 A1 | 5/2009 | Chang et al. | |
| 2009/0294366 A1 | 12/2009 | Wright et al. | |
| 2010/0303693 A1 | 12/2010 | Leppin | |
| 2010/0313752 A1 | 12/2010 | Powell et al. | |
| 2011/0186441 A1 | 8/2011 | LaFrancois et al. | |
| 2012/0060686 A1 | 3/2012 | Kortunov et al. | |
| 2012/0085232 A1 | 4/2012 | Sethna et al. | |
| 2012/0171095 A1 | 7/2012 | O'Brian et al. | |
| 2012/0211423 A1 | 8/2012 | Kim et al. | |
| 2012/0222442 A1 | 9/2012 | Dieckmann et al. | |
| 2013/0139695 A1 | 6/2013 | Chang et al. | |
| 2013/0305922 A1 | 11/2013 | Matzger et al. | |
| 2015/0122727 A1 | 5/2015 | Karnik et al. | |
| 2016/0046360 A1 | 2/2016 | Kim et al. | |

OTHER PUBLICATIONS

USPTO Non-Final Office Action, U.S. Appl. No. 15/271,175 (dated Aug. 10, 2017).

USPTO Non-Final Office Action, U.S. Appl. No. 15/272,406 (dated Jan. 25, 2018).

Yang, et al., Efficient SO2 Capture by Amine Functionalized PEG, Phys. Chem. Chem. Phys. 15: 18123-18127 (2013).

Zhu, Lewis-Base Polymers for Modifying Absorption and Desorption Abilities of Silica Supported, Amine Based Solid Carbon Dioxide Capture Materials, M.S. Thesis, University of Missouri—Columbia (Dec. 2014).

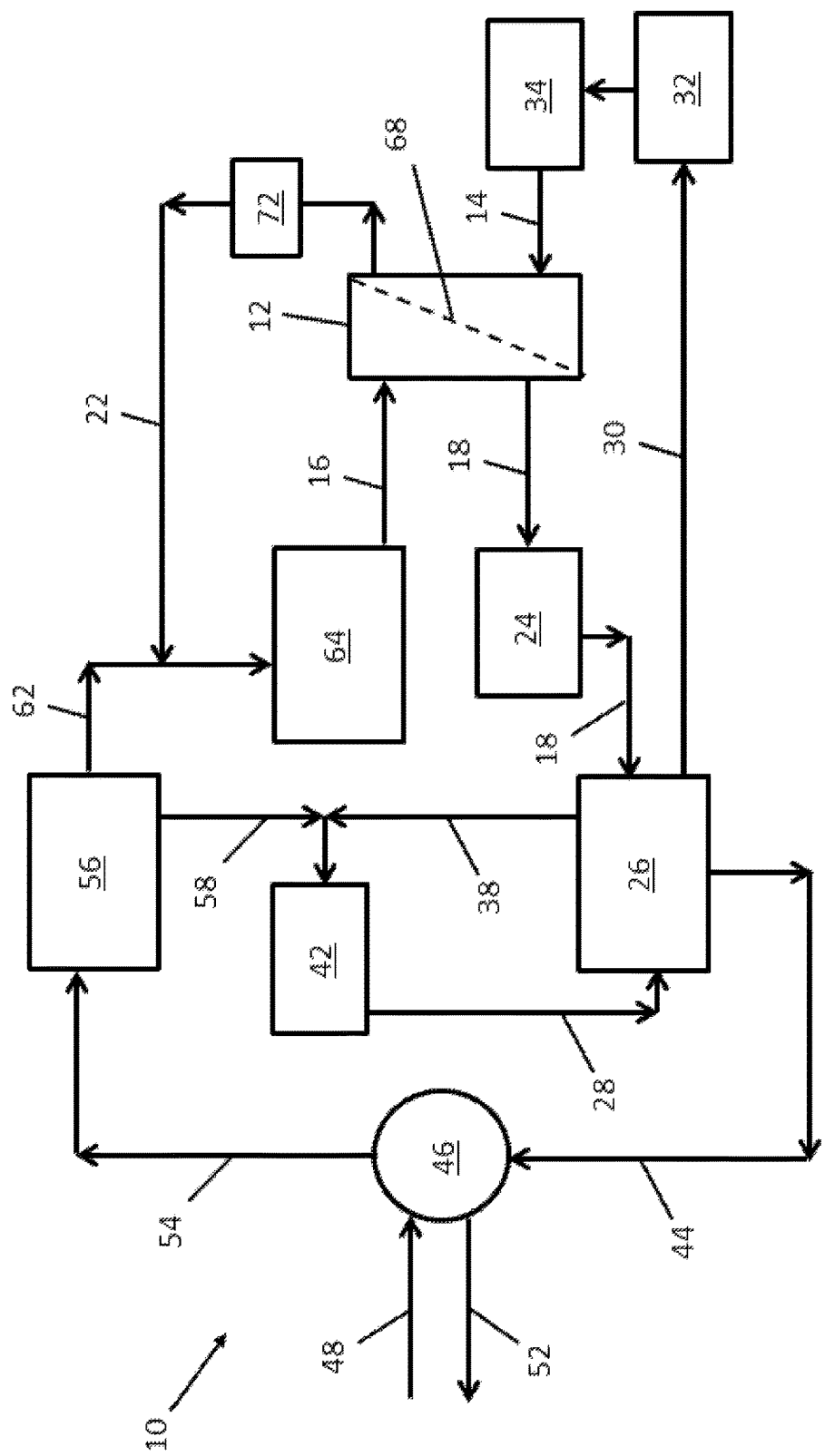

POWER GENERATION FROM LOW-TEMPERATURE HEAT BY HYDRO-OSMOTIC PROCESSES

CORRESPONDING PATENT APPLICATIONS

The present application (i) is a continuation-in-part of non-provisional application Ser. No. 15/271,175, filed Sep. 20, 2016, which claims priority from provisional application Ser. No. 62/372,762 filed Aug. 9, 2016, (ii) is a continuation-in-part of non-provisional application Ser. No. 15/272,406, filed Sep. 21, 2016, and (iii) claims priority from provisional application Ser. No. 62/417,864, filed Nov. 4, 2016, the entire contents of all four of which are incorporated herein in their entirety by reference.

BACKGROUND

The present invention relates to power generation from low-temperature heat, either from waste heat, solar-thermal sources or geothermal sources, using hydro-osmotic processes for generating electrical energy at a thermal efficiency greater than 30%, well in excess of heat engine cycles for such low-temperature heat.

Captured and reused waste heat is an emission-free substitute for costly purchased fuels or electricity. Numerous technologies are available for converting waste heat to power. Nonetheless, anywhere around 513 quadrillion Btu/yr of waste heat energy remains unrecovered or unconverted to power. The United States industrial sector accounts for approximately one third of all energy used in the United States, consuming approximately 32 quadrillion Btu (1015 Btu) of energy annually, and emitting about 1,680 million metric tons of carbon dioxide associated with this energy use. During these manufacturing processes, as much as 20 to 50% of the energy consumed is ultimately lost via waste heat contained in streams of hot exhaust gases and liquids, as well as through heat conduction, convection, and radiation from hot equipment surfaces and from heated product streams.

The efficiency of generating power from waste heat recovery is heavily dependent on the temperature of the waste heat source. In general, economically feasible power generation from waste heat has been limited primarily to medium- to high-temperature waste heat sources (i.e. >500° F.). Emerging technologies, such as organic Rankine cycles, are beginning to lower this limit, though they are hampered by low power conversion efficiency, and further advances in alternative power cycles are needed for economic feasibility of power generation at lower temperatures.

The largest amount of waste heat is in the low-temperature group, defined as waste heat in the temperature region of 150° C. to 275° C., although higher temperatures may still be considered low-temperature in the context of waste heat energy conversion. All of the various technologies currently being investigated for such a temperature regime have relatively low efficiency and high capital costs, when used for low-temperature waste heat sources for power generation.

Heat sources at different temperatures have varying theoretical efficiency limits for power generation. Maximum efficiency of a heat engine to run a power generation system at a given temperature is based on the Carnot efficiency. The Carnot efficiency represents the maximum possible efficiency of an engine at a given temperature. The Carnot efficiency increases for higher temperatures and drops dramatically for lower temperatures, with heat engine efficiency becoming very low for temperature differences of 150-200° C. ($\eta \approx 15\text{-}20\%$). In addition, a heat exchanger's or a recuperator's surface area increases disproportionately with lower temperature waste heat sources, limiting their economics.

Some applicable technologies for power generation from low-temperature waste heat are Steam Rankine Cycles (SRC), wherein power generation from waste heat involves using the heat to generate steam in a waste heat boiler, which then drives a steam turbine. In the Steam Rankine Cycle, the working fluid, typically water, is first pumped to elevated pressure before entering a heat recovery boiler. The pressurized water is vaporized by the hot exhaust and then expanded to lower temperature and pressure in a turbine, generating mechanical power that can drive an electric generator. The low-pressure steam is then exhausted to a condenser at vacuum conditions, where heat is removed by condensing the vapor back into a liquid. The condensate from the condenser is then returned to the pump and the cycle continues. Organic Rankine Cycles (ORC), involve other working fluids with better efficiencies at lower heat source temperatures used in ORC heat engines. ORCs use an organic working fluid that has a lower boiling point, higher vapor pressure, higher molecular mass, and higher mass flow compared to water. Together, these features enable higher turbine efficiencies than in an SRC. ORC systems can be utilized for waste heat sources as low as 300° F., whereas steam systems are limited to heat sources greater than 500° F. ORCs have commonly been used to generate power in geothermal power plants, and more recently, in pipeline compressor heat recovery applications. The Kalina cycle involves a mixture of water and ammonia as the working fluid, which allows for a more efficient energy extraction from the heat source. The Kalina cycle has an operating temperature range that can accept waste heat at temperatures of 200° F. to 1,000° F. and is 15 to 25 percent more efficient than ORCs at the same temperature level. Kalina cycle systems are becoming increasingly popular overseas in geothermal power plants, where the hot fluid is very often below 300° F. Even liquid carbon dioxide has been proposed as a working fluid.

SRCs are the most familiar to industry and are generally economically preferable where the source heat temperature exceeds 800° F. For lower temperatures, ORC or Kalina cycle systems are used. They can be applied at temperatures lower than for steam turbines, and they are more efficient in moderate temperature ranges. Kalina systems have the highest theoretical efficiencies. Their complexity makes them generally suitable for large power systems of several megawatts or greater. ORC systems can be economically sized in small, sub-megawatt packages, and they are also well suited for using air-cooled condensers, making them appropriate for applications such as pipeline compressor stations that do not have access to water.

In addition to Rankine cycle systems, there are a number of other advanced technologies in the research and development stage that can generate electricity directly from heat, and that could in the future provide additional options for power generation from waste heat sources. These technologies include thermoelectric, piezoelectric, thermionic, and thermo-photovoltaic (thermo-PV) devices that use solid state systems that require no moving parts and sit directly in the waste stream. Several of these have undergone prototype testing in automotive applications and are under development for industrial heat recovery. Utilizing liquid streams below 200° F. and gas streams below 500° F. typically remains economically impractical with today's technologies, however. Conversion to electricity is less efficient with all these technologies, compared to traditional electric generators, and project costs currently run high for a variety of reasons, including the cost of the equipment and the cost of integrating the waste heat recovery system with the waste heat source.

The total cost to install waste heat to power (WHP) systems include the costs associated with the waste heat recovery equipment (boiler or evaporator), the power generation equipment (steam, ORC, or Kalina cycle), power conditioning and interconnection equipment. It would also include the soft costs associated with designing, permitting and constructing the system. The installed costs of Rankine cycle power systems (steam, ORC or Kalina) are fairly similar, differing more as a function of project size and the complexity of site integration than type of system.

All of the various technologies detailed above have relatively low efficiency and high capital costs when used for low-temperature waste heat sources for power generation. Typically, the Kalina cycle (water-ammonia mixtures) has an efficiency of around 12-15%, while thermo-electric generators have an efficiency of 5-7%. Piezo-electric generators currently have an efficiency of around 1%, and much developmental work needs to be done before they are cost-effective. Thermo-ionic generators and thermo-photovoltaic systems are still being investigated at the laboratory scale for low-temperature WHP applications.

Thus, there is a significant industrial and environmental need for a power generation system for conversion of low-temperature waste heat ($\approx$150-275° C.) to electrical energy, not limited by the ideal Carnot cycle efficiency.

Forward osmosis (FO) is a technology currently being explored for desalination of seawater. Unlike reverse osmosis (RO) processes, which employ high pressures ranging from 400-1100 psi to drive fresh water through a membrane, forward osmosis uses the natural osmotic pressures of salt or polymer solutions, called 'draw solutions', to effect fresh water separation. A draw solution having a significantly higher osmotic pressure than the saline feed-water, flows along the permeate side of the FO membrane, and water naturally transports itself across the membrane by osmosis. Osmotic driving forces in FO can be significantly greater than hydraulic driving forces in RO, leading to higher water flux rates and recoveries. Thus, it is a low-pressure system, allowing design with lighter, compact, less expensive materials. These factors translate in considerable savings, both in capital and operational costs.

Joint research by Yale University and Oasys Inc, under an Office of Naval Research grant, compared forward osmosis to reverse osmosis processes, and found superior performance and flux rates. Based on these studies, Oasys developed a forward osmosis process using ammonium bicarbonate aqueous solutions as the draw down liquids. Other FO processes have been proposed, using either magnesium chloride draw solutions, polymeric draw solutions based on polyethylene glycols, volatile solutes like dimethyl amines, sulfur dioxide or aliphatic alcohols, or bivalent/precipitable salts like aluminum sulfate/calcium hydroxide (Modern Water, UK). Glucose or sucrose have been used as solutes for the draw solution, which can then be ingested after suitable dilution (Hydration Technologies International Inc). Polymeric draw solutions have also been developed based on polyethylene glycols (PEGs) and polypropylene glycols (PPGs).

Solutions of magnesium chloride, ammonium chloride, calcium chloride in water, and polymers like PEG/PPG solutions in water generate very high osmotic pressures, in the range of 300-400 atm, based on their concentration. The ionic salts mentioned above, as well as sodium and potassium bicarbonates, also do not decompose or scale at the temperatures contemplated herein, while the water in the salt solution can be substantially boiled off by the application of low-temperature waste heat, thus regenerating the concentrated salt solutions needed for hydro-osmotic power generation. The preferred draw solute for this application would be the ionic chlorides of magnesium or calcium, due to their very high osmotic potentials at a concentration of 2.5M to 3.0M, as well as the minimized scaling of these salts at steam temperatures. The use of these salts also enables the temperature in the boiler/heat exchanger to be higher, called the Top Brine Temperature (TBT) to around 125-150° C., which increases the efficiency of the boiler. However, the main drawback in the use of these concentrated ionic solutions is the need to boil off and recover the water of dilution, since the latent heat of vaporization of water is around 970 Btu/lb of water to be removed, a substantial energy penalty.

Similarly, polymeric draw solutions also generate very high osmotic potentials, and are also not volatile, with very high boiling points 230° C.), suitable for power generation from low-temperature waste heat. A polyethylene glycol (PEG) solution generates very high osmotic pressures for its solutions in water, depending on its concentration. Thus, a 95% solution in water of PEG 400 at 20° C. has a calculated osmotic pressure of 658 atm; for PEG 600, it is 977 atm; for PEG 2000, it is 2540 atm.

Polyethylene glycols (PEGs), polymers of ethylene glycol (EG), have been used in industry to produce very high osmotic pressures, in the order of tens of atmospheres. In comparison, seawater (3.5% NaCl) has an osmotic pressure of only 28 atms at 25° C. PEGs are hypotonic by nature, and absorb water exceedingly well. The hydrogen bonding between water molecules and the electron-rich ether oxygen in the EO (ethylene oxide) monomer enables almost 2.5-3.0 molecules of water to be coordinated with each EO monomer, leading to high osmotic pressures. Thus, the greater the number of EO monomers in the PEG molecule, the greater the osmotic pressure exhibited. One issue with longer chain-length PEGs is higher viscosity and higher melting points, as the chain length increases. PEG 200 (EO=4), PEG 300 (EO=6-7) and PEG 400 (EO=9) are all liquid at room temperatures, whereas PEG 600 (EO=12-13) is a waxy solid at room temperature, as are the higher molecular weight PEGs. Thus, a practical limit in the PEG chain length prevents use of increasingly longer chain-length PEGs for water absorption.

These polymers, by suitable chemical modification (like propoxylation, butoxylation or addition of fatty acids or fatty bases to their chains) can also be rendered hydrophobic at higher temperatures, called "cloud point" or critical point temperatures. If an hydrophobic entity, like propanediols or butanediols or fatty acids/bases, is attached to the PEG molecule, the hydrophobic-lipophilic balance (HLB) of the copolymer can be suitably shifted, such that phase separation can occur at certain temperatures, usually termed cloud-point or critical temperatures, as mentioned in the paragraph above. The draw solute copolymers consist of various numbers and orders of diols, which impart the required solution properties. Osmotic pressure, cloud point temperature, molecular weight and molecular structure can be adjusted by adding or subtracting the various monomer units. Within the constraints of osmotic pressure and cloud point temperature, the chemistry of the draw solute polymers can be selected to control the molecular weight (preferably greater than 600)

and/or physical structure of the polymer (preferably branched) resulting in high (>90% and preferably >99%) rejection of the draw solute through filtration. Further, the chemistry of the draw solute polymers can be selected to incorporate larger molecules to minimize back diffusion of the solute through the forward osmosis membrane.

Such "cloud point" polymers, also called thermo-sensitive polymeric solutions, have been considered as suitable osmotic draw solutes. These polymers have a tendency for phase separation from their water solutions at a critical temperature, and thus can be suitably separated from the permeated water of the FO process. Both lower and upper critical temperatures have been exhibited, depending on the configuration of the polymer molecule. At the lower critical temperature, the polymer separates into a hydrophobic layer from the water, and thus, can be re-concentrated by nanofiltration or other techniques for recycling as a concentrated draw solute for the next cycle of FO. Some polymers can re-dissolve in water above the upper critical temperature.

While the PEGs used in these copolymers are linear in structure, and increase in melting point and viscosity as the chain-length increases, there are other forms of PEGs available, with different geometries, that are termed branched or multi-armed PEGs. Branched PEGs have 3-10 PEG chains emanating from a central core group. Star PEGS have 10 to 100 PEG chains emanating from a central core group, while comb PEGs have multiple PEG chains grafted onto a polymer backbone. Such branched PEGs allow more EO groups in the polymer, while remaining in the liquid state and having lower melting points and viscosity than comparable linear PEGs with the same number of EO monomers. Thus, the use of such PEG geometries can enable higher water absorption, while retaining the practicality of using higher number of EO monomers for water molecule interaction by hydrogen bonding. An additional property of these branched PEG polymers, as described in co-pending U.S. patent application Ser. No. 15/271,175, filed Sep. 20, 2016, and Ser. No. 15/272,406, filed Sep. 21, 2016, the entire contents of each of which are incorporated herein in their entirety by reference, is also the ability to phase-separate from water by suitable amine-termination of the branched ends of these polymers and subsequent absorption of carbon dioxide.

The preferred engineered polymers, for the practical application of embodiments of this invention for power generation from low-temperature waste heat would be polymers with a high osmotic potential, preferably around 400-600 atms, but low critical temperatures for phase separation from their water mixtures. The hydrophilic-lipophilic balance (HLB) of polymers defines the water solubility, osmotic potential and the cloud point temperature of these engineered polymers. The higher the HLB ratio, the higher the osmotic potential, but also the higher the cloud point temperature. While, traditionally, the use of similar polymers in desalination and saline waste-water treatment systems, limits the HLB ratio to around 10-13, to keep the cloud point temperature lower than 60° C., for this particular application of hydro-osmotic power generation, an HLB ratio of around 14-17 is preferred, but an associated phase separation temperature of below 70-85° C. Such properties of suitably engineered polymers enable high flux rates against fresh water across the FO modules, while efficiently phase-separating at temperatures associated with low-temperature waste heat ($\approx$150-275° C.), without inordinately large heat transfer surfaces. Some such polymers would be block or random branched co-polymers of ethoxylate-propoxylates like sorbitol ethoxylate-propoxylates, sorbitan ethoxylate-propoxylates, glycerol ethoxylate-propoxylates, trimethylolpropane ethoxylate-propoxylates, pentaerithritol ethoxylate-propoxylates, glucose and sucrose ethoxylate-propoxylates, other poly-hydric polymers, and similar branched derivatives of these ethoxylate-propoxylate co-polymers.

Modification of these polymer derivatives by amine-termination enables them to undergo phase-separation from water, or inverse solubility in water, by absorption of $CO_2$, as described in co-pending U.S. patent application Ser. No. 15/271,175, filed Sep. 20, 2016, and Ser. No. 15/272,406, filed Sep. 21, 2016, the entire contents of each of which are incorporated herein in their entirety by reference. Use of such polymers, with their high osmotic pressures, and their property of inverse solubility with water by $CO_2$ absorption, can be used for hydro-osmotic power generation.

A great quantity of energy can be potentially obtained when waters of different salinities are mixed together. The harnessing of this energy for conversion into hydro-osmotic power can be accomplished by means of a technology called Pressure Retarded Forward Osmosis (PRFO). This technique uses a semi-permeable membrane to separate a less concentrated solution, or solvent, (for example, fresh water) from a more concentrated and pressurized solution (for example an osmotic draw agent), allowing the water to pass to the concentrated solution side. The difference in osmotic potential between two solutions, separated by a semi-permeable membrane, yields a pressure differential, which is similar to the effect of gravity in creating potential energy (static head) for conversion to hydroelectric energy. Normal hydropower plants use the static head of water in dams to yield energy when the water is allowed to run through turbine generators. Similarly, osmotic pressure differentials can also be used to drive hydro-turbine generators to create energy. The additional fluid volume due to the permeation of water increases the pressure on the permeate side, which is depressurized in a hydro-turbine to produce power—thus the term 'hydro-osmotic power'.

The use of the above-mentioned engineered polymers are useful for hydro-osmotic power generation. It is estimated that the thermal efficiency of "ionic salt" based osmotic power is less than 5%. Even the use of common cloud-point polymers has a substantial energy penalty, since the entire polymer-water mixture has to be heated up to the cloud point temperature for inducing phase separation. It is estimated that the thermal efficiency of "cloud-point polymer" based osmotic power is less than 7%.

SUMMARY

In one embodiment, a system is provided for generating power from waste heat using osmotic polymers that can be regenerated using $CO_2$ absorption, the system comprising (1) a forward osmosis (FO) module comprising an FO membrane configured to permit the passage of an osmotic polymer draw solution solute along the membrane to draw water across the membrane, the FO module further comprising a water inlet connected to a water inlet line and a water outlet connected to a water outlet line, the FO module further comprising a draw solution solute inlet connected to a draw solution solute inlet line and diluted draw solution outlet connected to a diluted draw solution outlet line; (2) a hydro-turbine connected to the diluted draw solution outlet line for generating power as diluted draw solution passes therethrough; (3) a $CO_2$ absorption reactor configured to permit the introduction of compressed $CO_2$ into the diluted draw solution so as to cause substantial separation of draw solution solute from the water, which water can be processed for subsequent recycling to the FO module for continued power generation during the forward osmosis cycle, the $CO_2$ absorption reactor configured to discharge a mixture of separate draw solution solute and absorbed $CO_2$; and (4) a heat exchanger for transferring waste heat from an incoming heated fluid to the mixture of draw solution solute and $CO_2$. In one embodiment, the system further comprises (5) a $CO_2$ desorption reactor configured to separate the $CO_2$ from the separate draw solution solute so as to regenerate the draw solution solute for recycling to the permeate side of the membrane in the FO module. In one embodiment, the system further comprises a pressure regulator in the water outlet line of the FO module configured such that the FO module can be operated as a pressure assisted FO module when in use. In one embodiment, the draw solution solute comprises an amine-terminated branched polymer, which could be an amine-terminated branched PEG.

In one application, a method is provided for generating power from waste heat using osmotic polymers that can be regenerated using $CO_2$ absorption, the method comprising: directing water and an osmotic polymer draw solution solute into a forward osmosis (FO) module comprising an FO membrane configured to permit the passage of the osmotic polymer draw solution solute past the membrane to draw the water across the membrane, the FO module further comprising a water inlet connected to a water inlet line and a water outlet connected to a water outlet line, the FO module further comprising a draw solution solute inlet connected to a draw solution solute inlet line and diluted draw solution outlet connected to a diluted draw solution outlet line; directing diluted draw solution through a hydro-turbine connected to the diluted draw solution outlet line for generating power; directing compressed $CO_2$ into a $CO_2$ absorption reactor configured to permit the introduction of the compressed $CO_2$ into the diluted draw solution so as to cause substantial separation of draw solution solute from the water, which water can be processed for transfer to the FO module, the $CO_2$ absorption reactor configured to discharge a mixture of draw solution solute and $CO_2$; and directing the mixture of draw solution solute and $CO_2$ into a heat exchanger for transferring waste heat from an incoming heated fluid to the mixture of draw solution solute and $CO_2$. In one embodiment, the method further comprises directing the heated mixture into a $CO_2$ desorption reactor configured to separate the $CO_2$ from the draw solution solute so as to regenerate the draw solution solute for transfer to the FO module. In one embodiment, the method further comprises pressuring the water inlet into the FO module such that the FO module can be operated as a pressure assisted FO module. In one application, the draw solution solute comprises an amine-terminated branched polymer, which could be an amine-terminated branched PEG.

BRIEF DESCRIPTION OF THE FIGURES

The aforementioned objects and advantages of the present invention, as well as additional objects and advantages thereof, will be more fully understood hereinafter as a result of a detailed description of a preferred embodiment when taken in conjunction with the following drawings in which:

FIG. 1 shows a schematic view of one embodiment of the present invention.

DETAILED DESCRIPTION OF CERTAIN EMBODIMENTS

Embodiments of the present invention employs an FO system for a power generation process capable of efficiency greater than 25% in the conversion of low-temperature waste heat to power, and economically cheap to exploit. Referring to FIG. 1, for example, system 10 reflects one embodiment of a system configured to convert waste heat into power. In one embodiment system 10 comprises an FO module 12 configured for an inlet line of water 14, an inlet line for draw solution solute 16 and an outlet line of diluted draw solution 18. The FO module also comprises an outlet line 22 of water and some residual draw solution (as explained further below).

The diluted draw solution 18 is directed to a hydro-turbine 24 for generation of power, with the diluted draw solution 18 further directed to a gas-liquid mixer 26 where compressed $CO_2$ 28 is injected into the diluted draw solution 18 to separate the water from the draw solution solute. An outlet line of water-rich solution 30 is then directed to a means for cooling 32, such as by example a cooling tower, and into water storage 34. Some residual draw solution solute may still reside in the water-rich solution 30, which is why some of the residual draw solution solute may pass through the FO module into outlet line 22.

The unabsorbed $CO_2$ 38 from the gas-liquid mixer 26 is then directed to a $CO_2$ compressor 42 for delivery back to the gas-liquid mixer 26. The output of the gas-liquid mixer 26 is a mixture of $CO_2$ and draw solution solute 44, which is then directed to a heat exchanger 46, into which waste heat 48 (in the form of, for example, hot gas) is directed for purposes of transferring heat to the $CO_2$/draw solution solute mixture 44. The cooled gas 52 is then directed away from the heat exchanger 46, leaving a heated mixture of $CO_2$ and draw solution solute 54, which is then directed into a $CO_2$ desorption module 56 to separate the $CO_2$ 58 from the regenerated draw solution solute 62. The separated $CO_2$ is then directed to the $CO_2$ compressor 42, while the concentrated draw solution solute 62 is then directed to a means for cooling 64, which for example could be a cooling tower, before being introduced back into the FO module 12. A membrane 68 is provided in the FO module, which membrane is described further herein. In one embodiment, a pressure regulator 72, for example a controllable valve, is provided in the outlet line 22 of the FO module to maintain the elevated pressure of the incoming water line 14, as described further herein.

As reflected by example in FIG. 1, one embodiment of the process for power generation from low-temperature waste heat uses $CO_2$-philic polymers as osmotic agents. For example, as described in co-pending applications identified above, acceptable osmotic solutes include amine-terminated branched polymers, including amine-terminated branched PEGs; for example, amine-terminated glycerol ethoxylate, trimethylolpropane ethoxylate, and/or amine-terminated pentaerithritol ethoxylate. Ionic draw solutes are also contemplated.

The main elements of the system function as follows: a concentrated osmotic draw solution is pumped under low pressure (for example, ≈1-2 atms) through the permeate side of a forward osmosis membrane module 12, while fresh water 14 is pumped at slightly higher pressures (for example, ≈1-3 atms) through the feed side of the FO membrane module 12. Based on the osmotic potential of the draw solution and the membranes used, water is pulled across the semi-permeable membrane at a high flux rate. Typical FO draw solutions have an osmotic potential of around 200-400 atms, but can be higher depending upon the solute, while fresh water has no discernible osmotic potential. This huge osmotic potential difference between the two liquid streams enables high flux rates across the membrane 68.

When power generation is needed, a concentrated/regenerated (preferably polymeric) draw solution is pumped at low pressure (15 psig) through the draw side of the FO module 12, preferably a pressure-assisted forward osmosis (PAFO) membrane system, while fresh water is routed through a low-pressure water pump (15-30 psig) to the feed side of the PAFO membrane 68, at a slightly higher pressure than the draw solution (DS) pump. The high difference in osmotic potentials between these two streams—draw solution water—across the FO membrane 68, assisted by the slightly higher hydraulic pressure from the water pump, enables large volumes of water at high flux rates ($\approx$50-150 liters/m2/hr, LMH) to permeate across the membrane, resulting in a pressurized fluid flow from the increased volume of liquid after membrane permeation. This mixed stream is, in turn, routed through a high-flow hydro-turbine 24, to produce hydro-power as needed. The vastly increased flow of water and draw solution across the high-flow hydro-turbine results in efficient production of electrical energy, with efficiency levels reaching hydro-electric turbines (75-90%), unlike the use of heat engines (with their inherent Carnot cycle limitations for low-temperature heat streams).

The polymeric draw solutions preferably used are $CO_2$-philic, and undergo a phase separation from water when the polymeric molecules absorb $CO_2$. Thus, once $CO_2$ is injected under pressure (preferably around 50-75 psig) into the water-polymer mixture, in a suitably engineered gas-liquid mixer 26, the polymer absorbs the injected $CO_2$ and therein substantially phase-separates from its water solution. The separated water-rich stream 30, essentially consisting of most of the permeated water across the FO membrane 68, is directed to a cooling tower 32 and thence to water storage 34. Any water (which has not permeated through the FO membrane) and residual polymer still left in the water-rich stream 22, is directed to the polymer-rich stream 62.

The $CO_2$-philic polymer 44, now substantially phase-separated from its water solution, is directed to a heat exchanger 46, wherein the temperature of the stream is raised to its $CO_2$ desorption temperature (70-85° C.). The hot stream 54 is thereby directed to a gas desorption system 56, wherein most of the injected $CO_2$ is recovered and directed to a $CO_2$ compressor 42 for pressurization and the next cycle of gas injection. The $CO_2$-free polymeric stream is directed to a cooling tower 64 before being used in the next cycle of power production in the FO system. Any un-absorbed $CO_2$ 38 in the gas-liquid mixer is directed to the compressor 42 inlet for a closed loop, minimizing a loss of $CO_2$ in the process.

A main advantage of the above-described process is the lower volume of the liquid stream to be subjected to a temperature increase in the heat exchanger, since most of the water from the diluted draw solution has already been separated in the gas-liquid mixer, under the action of $CO_2$, to cause phase separation between polymer-rich and water-rich phases. Given that the inherent specific heat of the preferred polymer ($\leq$0.8) is lower than the specific heat of water, decreased heat supply is needed for raising its temperature for $CO_2$ desorption and polymer regeneration, if minimal water is present in the mixture to be heated. The power needs for the $CO_2$ compressor and the pumps needed in embodiments of the present invention, including the example shown in FIG. 1, are the main penalties in energy production and energy efficiency.

The efficiency of the hydro-turbine depends on the flow rate of the mixture of draw solution and water, which in turn, is dependent on the flux rate of water across the FO membrane 68, driven by the osmotic gradient between fresh water and the draw solution. The power generation cycle depends on high flux rates across the FO membranes. Earlier FO membranes had low flux rates ($\approx$3-5 liters/m2/hr, LMH), leading to an energy density of less than 5 Watts/m2 or lower, thus needing very large membrane areas, in turn resulting in high capital costs. In addition, operation in the conventional pressure retarded (PRFO) mode caused a reduction in flux rates, since the applied hydraulic pressure worked against the osmotic pressure of the draw solution.

Embodiments of the present invention comprise pressure assisted forward osmosis for the forward osmosis module, which serves to increase flux across the membrane 68. The PAFO mode of operation is made feasible for this particular application, given that the feed solution is essentially fresh water, and hence membrane fouling, or salt migration through the membrane, are not operational issues. Pressurizing the feed water enables higher trans-membrane flux rate, while assisting the osmotic pressure on the draw side of the membrane. The PAFO mode, due to the applied pressure on the feed side, also reduces reverse flux of the osmotic agent to the feed side, an improvement over current FO practices. In addition, concentration polarization effects are minimized, maintaining the required flux rates. Forward osmosis membrane performance is critically dependent on the diffusion of the draw solute to the support layer of the membrane and its diffusion back to the bulk solution after osmotic dilution—the PAFO mode helps in optimizing FO membrane performance. In the application of the invention described herewith, the draw solution (DS) is preferably on the active layer (AL) side of the membrane, while the water is on the porous support layer side of the membrane (the AL-DS mode), minimizing polarization effects.

The proposed power generation system embodiments are practical and feasible due to current availability of commercial high-flux membranes (>50 LMH) for the PAFO mode. Commercially available carbon nanotube FO membranes from, for example, Porifera (PFO-9S) have a membrane surface area of 67 $m^2$. For a feed concentration of 30% PEG 400 (osmotic potential of 48 atm) against fresh water, the flux rate of water across the membrane was measured at 33 liters/$m^2$/hr (LMH). For a 95% PEG 400 draw solution (osmotic potential>400 atm $\approx$12,842 ft of water head) against fresh water, a flux rate well in excess of 165 LMH is easily possible (an 8.33x increase in osmotic potential), especially since the feed side is fresh water, operated in the PAFO mode. Thus, across a PFO-9S FO membrane, the total water flux would be around 11,055 liters/hr (2,920.5 gallons/hr). This equates to 48.675 GPM, in excess of the 45 GPM used in power generation calculations.

Alternatively, and preferably, the use of nano-filtration (NF) membranes in the PAFO mode, with their higher pore sizes (Molecular Weight Cut-off, MWCO, of $\geq$200 Daltons, Da), enables the required high flow rates of 45 GPM needed for efficient generation of hydro-osmotic power. The larger pore diameter in the active layer of these membranes yields much higher water flux rates across these membranes, under low applied hydraulic pressures, as compared to traditional RO or FO membranes. Normally, NF membranes have lower salt rejection than traditional RO or FO membranes. However, given that substantially salt-free fresh water is used as the feed solution in the FO process, the increased benefit of higher flux rates and attendant higher power generation becomes the critical driver for membrane choice.

The equation for ideal hydro-dynamic calculations for the power generated by a hydro-turbine is: $P=Q*H/k$, where $P$=power in KW, $Q$=flow rate in GPM, $H$=static head in feet, and $k$=5,310 gal·ft/min·kW. Assuming a 200 atm differential in osmotic potential between the two solutions, the static head computes to almost 6,421 ft (1 atm=9.783 m; 1 m=3.281 ft).

If we assume an osmotic differential of 200 atm between the concentrated draw solution and the water feed solution, for a 45 GPM flow, the possible power rating of a hydro-electric turbo-generator is 54.415 KW, at 100% efficiency [$P$=(45 GPM)*(6421 ft/5310 gal·ft/min·KW)]. Hydropower is the most energy efficient power generator in industry. Currently, hydropower is capable of converting 90% of the available energy into electricity. Assuming an efficiency of 75% for hydro-osmotic power production, the net power generation capacity for the described invention (54.415*0.75), at the flow rates calculated above, is around 40.81 KW. Assuming a parasitic power need for the described system (for $CO_2$ compressor, pumps etc) of 15 KW, the net power capacity is around 25.81 KW for a 45 GPM liquid flow through the hydro-osmotic turbine, produced from low-temperature waste heat. Thus, the energy produced in 1 hour is 25.81 kWh.

If the now diluted draw solution is brought back to its original concentration, using low-temperature waste heat or using renewable energy, (e.g., from solar thermal sources) for re-cycling back to the FO system, an efficient hydro-electric power generation system would be feasible, similar to conventional pumped hydro-electric storage. Calculating the thermal needs for an embodiment such as that shown in FIG. 1, a 45 GPM flow equates to 2,700 gallons of liquid flow in one hour. If we assume the post-FO liquid mixture consists of 200 gallons (1,832.6 lbs) of concentrated draw solution (specific gravity≈1.1; specific heat≈0.8), fed to the FO module, and 2500 gallons of water to the FO module, and the 200 gallons of the $CO_2$-philic polymer is separated, the action of $CO_2$ absorption by the engineered polymers slightly raises its temperature due to the heat of reaction. Assuming the separated polymer is at 72° F. at the outlet of the gas-liquid mixer, before being directed to the heat exchanger, the energy needed to heat the polymer to its $CO_2$ desorption temperature of ≤200° F. would be around a maximum of 187,658.24 Btu (=1,832.6*128*0.8). Assuming a 75% efficiency of heat exchanger operations, the total waste heat energy required would be around 250,211 Btu. Transforming it to kWh (1 Btu=0.00029307 kWh), the approximate thermal energy needed to regenerate the osmotic polymer for the next cycle of power generation is 73.33 kWh.

Thus, the thermal efficiency for the process is 25.81 kWh/73.33 kWh=35.20%, for power generation from low-temperature waste heat (200-400° F.), using $CO_2$-philic polymeric draw solutions with an inherent osmotic potential of 200 atms, and high flux-rate FO modules with NF-FO membranes, used in the PAFO mode. The power generation efficiency is enhanced in the described invention, since only a small volume of the water-polymer mixture needs to be heated from waste heat, after phase separation of the polymer from water, for desorption of the absorbed $CO_2$.

This efficiency is well in excess for all current methods of power generation from low-temperature waste heat, including organic Rankine cycles (10-12% η), the Kalina cycle (12-15% η), thermo-electric generators (5% η) or other processes being developed. Such high efficiencies are possible, since the process does not rely on energy conversion by heat engines, and thus, is not limited by Carnot cycle constraints. The capital costs for the system are also low, in comparison to current methods for power generation from low-temperature waste heat. The draw solution agents are available fairly cheaply at industrial scales; the NF membrane modules are also readily available in industry; the heat exchangers do not have to fabricated from exotic alloys, since no salt solutions or corrosive agents are used in the system, and the temperatures are below the boiling point of water; and the pumps and other equipment can be made from reinforced plastics or stainless steels.

Persons of ordinary skill in the art may appreciate that numerous design configurations may be possible to enjoy the functional benefits of the inventive systems. For example, the embodiments of the present invention can be used on higher temperature and high temperature waste heat, where the efficiency of the system may change depending upon the temperature. Thus, given the wide variety of configurations and arrangements of embodiments of the present invention the scope of the invention is reflected by the breadth of the claims below rather than narrowed by the embodiments described above.

What is claimed is:

1. A method for generating power from waste heat using osmotic polymers that can be regenerated using $CO_2$ absorption, the method comprising:

directing water and an osmotic polymer draw solution solute into a forward osmosis (FO) module comprising an FO membrane configured to permit the passage of the osmotic polymer draw solution solute past the membrane to draw the water across the membrane, the FO module further comprising a water inlet connected to a water inlet line and a water outlet connected to a water outlet line, the FO module further comprising a draw solution solute inlet connected to a draw solution solute inlet line and diluted draw solution outlet connected to a diluted draw solution outlet line;

directing diluted draw solution through a hydro-turbine connected to the diluted draw solution outlet line for generating power;

directing compressed $CO_2$ into a $CO_2$ absorption reactor configured to permit the introduction of the compressed $CO_2$ into the diluted draw solution so as to cause substantial separation of draw solution solute from the water, which water can be processed for transfer to the FO module, the $CO_2$ absorption reactor configured to discharge a mixture of draw solution solute and $CO_2$; and directing the mixture of draw solution solute and $CO_2$ into a heat exchanger for transferring waste heat from an incoming heated fluid to the mixture of draw solution solute and $CO_2$, wherein the draw solution solute comprises an amine-terminated branched PEG.

2. The method of claim 1, further comprising directing the heated mixture into a $CO_2$ desorption reactor configured to separate the $CO_2$ from the draw solution solute so as to regenerate the draw solution solute for transfer to the FO module.

3. The method of claim 1, further comprising pressuring the water inlet into the FO module such that the FO module can be operated as a pressure assisted FO module.

* * * * *